(12) United States Patent
Kim

(10) Patent No.: US 10,313,585 B2
(45) Date of Patent: Jun. 4, 2019

(54) SURVEILLANCE METHOD AND APPARATUS

(71) Applicant: Hanwha Techwin Co., Ltd., Changwon-si (KR)

(72) Inventor: Ji Min Kim, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 236 days.

(21) Appl. No.: 15/366,564

(22) Filed: Dec. 1, 2016

(65) Prior Publication Data

US 2017/0163891 A1    Jun. 8, 2017

(30) Foreign Application Priority Data

Dec. 3, 2015   (KR) .................. 10-2015-0171433

(51) Int. Cl.
  H04N 5/232    (2006.01)
  H04N 17/00    (2006.01)

(52) U.S. Cl.
  CPC ....... *H04N 5/23241* (2013.01); *H04N 17/002* (2013.01)

(58) Field of Classification Search
  CPC .................. H04N 17/002; H04N 5/23241
  See application file for complete search history.

(56) References Cited

U.S. PATENT DOCUMENTS

| 7,131,136 | B2* | 10/2006 | Monroe ........... G08B 13/19641 725/105 |
| 9,282,297 | B2* | 3/2016 | Siann ..................... H04N 7/183 |
| 2003/0107655 | A1* | 6/2003 | Ishizaka .............. H04L 27/2601 348/211.2 |
| 2003/0128130 | A1* | 7/2003 | Kao ................. G08B 13/19634 340/693.1 |
| 2004/0169733 | A1* | 9/2004 | Ishizaka ............. H04N 5/23203 348/211.2 |

(Continued)

FOREIGN PATENT DOCUMENTS

| KR | 10-2009-0112979 A | 10/2009 |
| KR | 10-1455732 B1 | 10/2014 |
| KR | 10-1540447 B1 | 7/2015 |

*Primary Examiner* — Francis Geroleo

(74) *Attorney, Agent, or Firm* — Sughrue Mion, PLLC

(57) ABSTRACT

A surveillance method includes: an interrupt processing operation of determining whether an interrupt is generated and determining a type of the interrupt; a type-1 interrupt processing operation of, in response to determining that the interrupt is a type-1 interrupt, determining whether an event has occurred, and, in response to determining that the event has occurred, sending an event occurrence alarm to an outside of the surveillance apparatus using a second communicator, which transmits or receives data at a second frequency, and sending an image, corresponding to the event, acquired by an image sensor to the outside using a first communicator, which transmits or receives data at a first frequency higher than the second frequency; and a type-2 interrupt processing operation of, in response to determining that the interrupt is a type-2 interrupt, controlling the surveillance apparatus according to control information included in the type-2 interrupt, wherein the type-1 interrupt is an interrupt generated at a predetermined time interval.

19 Claims, 12 Drawing Sheets

(56) References Cited

U.S. PATENT DOCUMENTS

| | | | | |
|---|---|---|---|---|
| 2008/0122938 A1* | 5/2008 | Broberg | ............... | G08B 25/01 |
| | | | | 348/222.1 |
| 2013/0130739 A1* | 5/2013 | Kawakita | .............. | H04W 88/06 |
| | | | | 455/552.1 |
| 2015/0130935 A1* | 5/2015 | Siann | ................ | H04N 7/185 |
| | | | | 348/143 |
| 2017/0301201 A1* | 10/2017 | Siann | ................ | H04N 7/185 |

* cited by examiner

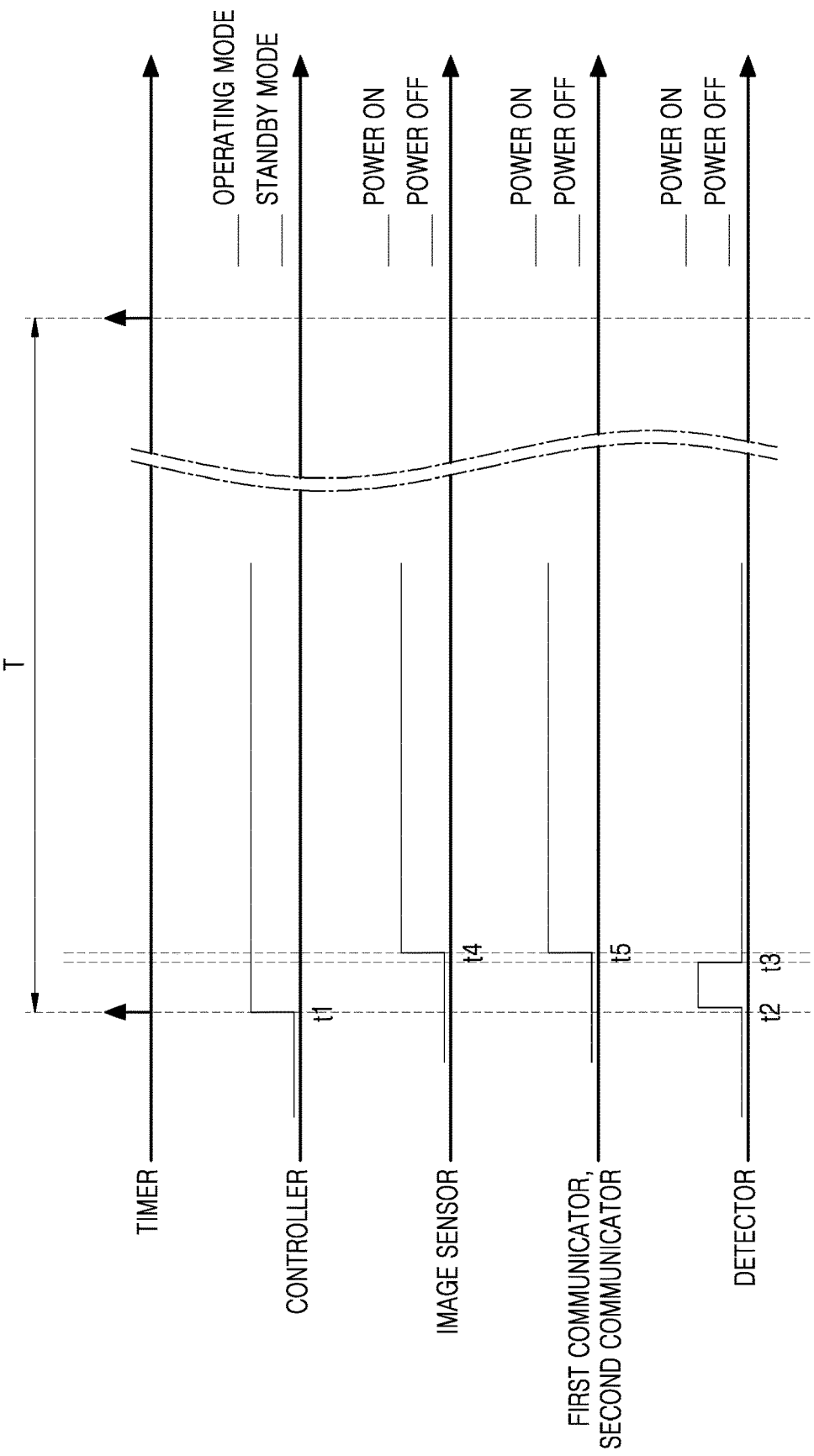

SURVEILLANCE METHOD AND APPARATUS

CROSS-REFERENCE TO THE RELATED APPLICATION

This application claims priority from Korean Patent Application No. 10-2015-0171433, filed on Dec. 3, 2015, in the Korean Intellectual Property Office, the disclosure of which is incorporated herein in its entirety by reference.

BACKGROUND

1. Field

Apparatuses and methods consistent with exemplary embodiments relate to surveillance, and more particularly to, a surveillance apparatus which is connected to an external apparatus through a plurality of communicators to perform surveillance.

2. Description of the Related Art

Many surveillance cameras are installed in an increasing number of places, and techniques for detecting an occurrence of an event from an image acquired by a surveillance camera and recording and storing the event have been developed.

The surveillance cameras are connected to an external power source by cable to receive power from the external power source, and also data acquired from the surveillance cameras is transferred to an external apparatus by wire.

Recently, as the number of installed surveillance cameras increases, an associated apparatus cannot be connected to all of the surveillance cameras by wire. Thus, many surveillance cameras have built-in batteries and transmit images wirelessly to perform surveillance. However, such surveillance cameras need frequent maintenance due to limited performance of the built-in batteries.

SUMMARY

One or more exemplary embodiments provide a surveillance apparatus capable of efficiently handling power by including a communicator configured to transmit or receive a large volume of data at high speed and a communicator configured to transmit or receive a small volume of data with low power.

One or more exemplary embodiments provide a surveillance apparatus that may minimize power consumption by temporarily supplying power only to an element associated with a corresponding interrupt when an interrupt is detected.

Various aspects of the inventive concept will be set forth in part in the description which follows and, in part, will be apparent from the description, or may be learned by practice of the presented exemplary embodiments.

According to one or more exemplary embodiments, a surveillance method may include: an interrupt processing operation of determining whether an interrupt is generated and determining a type of the interrupt; a type-1 interrupt processing operation of, in response to determining that the interrupt is a type-1 interrupt, determining whether an event has occurred, and, in response to determining that the event has occurred, sending an event occurrence alarm to an outside of the surveillance apparatus using a second communicator, which transmits or receives data at a second frequency, and sending an image, corresponding to the event, acquired by an image sensor to the outside using a first communicator, which transmits or receives data at a first frequency higher than the second frequency; and a type-2 interrupt processing operation of, in response to determining that the interrupt is a type-2 interrupt, controlling the surveillance apparatus according to control information included in the type-2 interrupt, wherein the type-1 interrupt is an interrupt generated at a predetermined time interval.

According to one or more exemplary embodiments, a surveillance apparatus may include: a first communicator configured to transmit or receive data to or from an outside of the surveillance apparatus at a first frequency; a second communicator configured to transmit or receive data to or from the outside of the surveillance apparatus at a second frequency lower than the first frequency; a timer configured to periodically generate a type-1 interrupt; and a controller configured to control transmission or reception of the data through the first communicator and the second communicator and detect the interrupt, wherein the controller determines whether an event has occurred in response to the controller detecting the type-1 interrupt generated by the timer, and, in response to determining that the event has occurred, sends an event occurrence alarm to the outside through the second communicator and sends an image, corresponding to the event, acquired by an image sensor to the outside through the first communicator, and wherein in response to the controller detecting a type-2 interrupt generated, the controller controls operation of at least one of the first communicator, the second communicator, the image sensor, and at least one detector configured to detect a physical quantity or the event, according to control information included in the type-2 interrupt.

BRIEF DESCRIPTION OF THE DRAWINGS

These and/or other aspects will become apparent and more readily appreciated from the following description of the exemplary embodiments, taken in conjunction with the accompanying drawings, in which:

FIG. 5 is a diagram for describing a mode of each element and whether power is supplied to each element over time when a detector detects an event, according to an exemplary embodiment;

DETAILED DESCRIPTION

Figure 1:
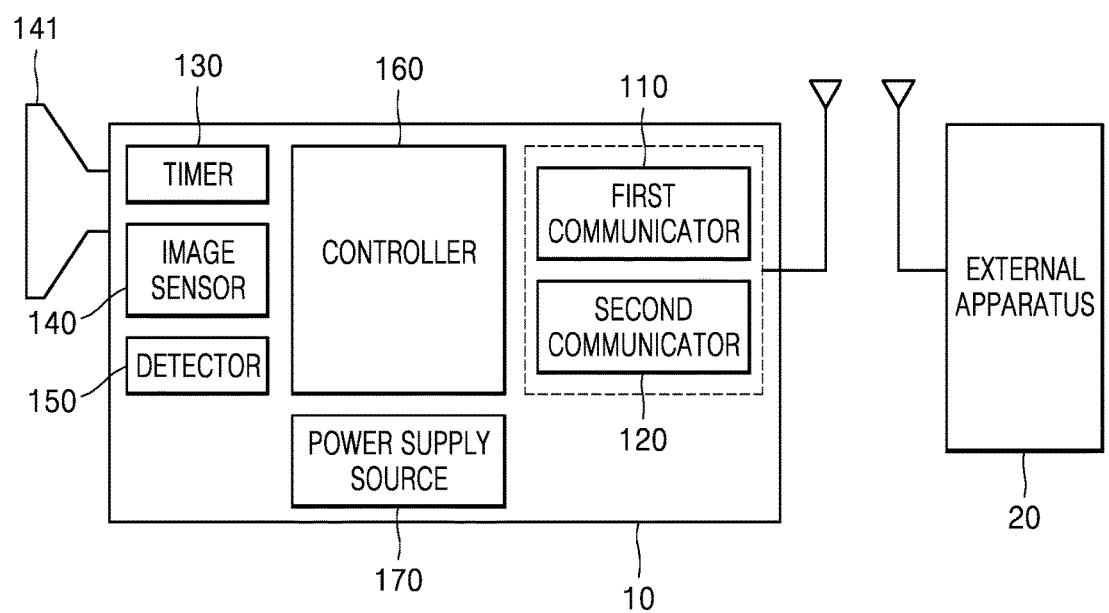
FIG. 1 schematically shows a surveillance system according to an exemplary embodiment.

Reference will now be made in detail to exemplary embodiments which are illustrated in the accompanying drawings, wherein like reference numerals refer to like elements (units, modules or components) throughout. In this regard, the exemplary embodiments may have different forms and is not to be construed as being limited to the descriptions set forth herein. Accordingly, the exemplary embodiments are merely described below with reference to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list.

As the inventive concept allows for various changes and numerous embodiments, particular exemplary embodiments are illustrated in the drawings and will be described in detail in the detailed description. It should be understood, however, that it is not intended to limit the inventive concept to particular exemplary embodiments, but rather, the disclosure is intended to cover all modifications, equivalents, and alternatives falling within the spirit and scope of the inventive concept as defined by the claims and their equivalents. Moreover, detailed descriptions related to well-known techniques are omitted when it is deemed that they may unnecessarily obscure the essence of the inventive concept.

Relational terms such as first, second, and the like may be used for describing various elements, but the elements should not be limited by the terms. These terms are used only to distinguish one element from another.

The terms used herein are merely used to describe particular exemplary embodiments, and are not intended to limit the inventive concept. The singular forms "a," "an," and "the" are intended to include the plural forms as well, unless the context clearly indicates otherwise. In the present specification, it is to be understood that the terms such as "including," "having," and "comprising" are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Exemplary embodiments of the inventive concept may be described in terms of functional block components and various processing operations. Such functional blocks may be realized by any number of hardware and/or software components configured to perform the specified functions. For example, the exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the inventive concept may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments could employ any number of conventional techniques for electronics configuration, signal processing and/or control, data processing and the like. The words "mechanism," "element," "means," and "configuration" are used broadly and are not limited to mechanical or physical embodiments, but may include software routines in conjunction with processors, etc.

FIG. 1 schematically shows a surveillance system according to an exemplary embodiment. Referring to FIG. 1, the surveillance system according to an exemplary embodiment may include a surveillance apparatus 10 and an external apparatus 20.

The surveillance apparatus 10 may determine whether an event has occurred in a surveillance region according to an interrupt that is periodically generated by a timer, and may send an image, which is acquired by the surveillance apparatus 10 when the event occurs, to the external apparatus 20. Also, the surveillance apparatus 10 may detect a corresponding physical quantity according to a physical quantity detection request received from another external apparatus (not shown) and send the detected physical quantity to the other external apparatus. Here, the other external apparatus may be the same as the external apparatus 20, and thus, the descriptions herebelow assume that they are one same external apparatus. The interrupt described herein may be an interrupt signal.

The surveillance apparatus 10 may include a first communicator 110 which transmits or receives data to or from the external apparatus 20 at a first frequency, a second communicator 120 which transmits or receives data to or from the external apparatus 20 at a second frequency lower than the first frequency, a timer 130 configured to periodically generate an interrupt, an image sensor 140 configured to acquire an image, at least one detector 150 configured to measure a physical quantity, and a controller 160 configured to control the first communicator 110 and the second communicator 120 to transmit or receive data to or from the external apparatus 20. Also, the surveillance apparatus 10 may further include a lens 141 configured to collect light so that the image sensor 140 may convert the light into an electric signal and a power supply source 170 configured to supply power to the controller 160.

The surveillance apparatus 10 may transmit or receive two types of data to or from the external apparatus 20. In more detail, the surveillance apparatus 10 may transmit or receive data that does not require a fast communication speed, such as data or information regarding setting of the image sensor 140, and data that requires a fast communication speed, such as image data acquired by the image sensor 140, to or from the external apparatus 20.

If the surveillance apparatus 10 includes only one communicator that is designed to transmit or receive the two types of data based on transmission or reception of image data that needs a fast communication speed, or both the first communicator 110 and the second communicator 120 are designed to transmit or receive the two types of data based on transmission or reception of image data that needs the fast communication speed, a power loss may occur because data that does not need a fast communication speed is also transmitted or received at the fast communication speed.

The surveillance apparatus 10 according to an exemplary embodiment includes two communicators, transmits or receives image data that requires a fast communication speed through the first communicator 110 that communicates at a high frequency (first frequency), and transmits or receives data that does not require a fast communication speed through the second communicator 120 that communicates at a frequency (second frequency) lower than the first frequency. Thus, it is possible to efficiently use power.

The surveillance apparatus 10 may transmit or receive data to or from the external apparatus 20 with only relatively low power consumption by transmitting or receiving data that does not require a fast communication speed, such as data or information regarding settings of the image sensor 140, through the second communicator 120.

The external apparatus 20 may be any suitable apparatus that uses a notebook, a mobile terminal such as a handheld device, a smartphone, and a tablet, a desktop computer, or the like or is directly or indirectly connected to these devices. Also, the external apparatus 20 may be a server included in a computing apparatus that operates the surveillance apparatus 10. At least some elements constituting the server may be implemented as software including at least one of an operating system, an application program module, and other program modules and may be physically stored in various types of well-known memory devices.

The first communicator 110 and the second communicator 120 according to an exemplary embodiment may transmit or receive data to or from the external apparatus 20. In detail, the first communicator 110 may communicate with the external apparatus 20 at the first frequency. The first communicator 110 may quickly transmit a large volume of data at a high bit rate. Since the high bit rate may be achieved by high frequency communication, the first communicator 110 may communicate with the external apparatus 20 in a high-frequency band. For example, the first communicator 110 may transfer an image acquired by the image sensor 140 to the external apparatus 20 using a frequency band with 2.4 GHz or 5.0 GHz of center frequency. That is, the surveillance apparatus 10 may send the image acquired by the image sensor 140 to the external apparatus 20 through the first communicator 110.

When the first communicator 110 does not transmit or receive data to or from the external apparatus 20, the controller 160 may shut off power to the first communicator 110.

Herein, a term "shutting off power" and a term "standby mode" are conceptually different. The term "shutting off" may mean that power supplied to a corresponding element (e.g., the first communicator 110) is physically blocked. The term "standby mode" may mean that a corresponding element operates in a low power consumption mode. In other words, the term "standby mode" may refer to a state in which power is supplied to a corresponding element, that is, a state other than an operating mode.

Herein, a term "supplying power" and a term "operating mode" are also conceptually different. First, as described above, the term "supplying power" may mean that an element that was powered off is physically supplied with power in order to operate the corresponding element. However, the term "operating mode" may mean that an element that was in "standby mode" operates in a normal mode.

The second communicator 120 may communicate with the external apparatus 20 at the second frequency. The second communicator 120 may transmit a small volume of data at a low bit rate using a relatively low frequency, compared to the first communicator 110. For example, the second communicator 120 may communicate with the external apparatus 20 using a frequency band with 868 MHz of center frequency. In this case, the second communicator 120 may also receive data or information regarding setting of the image sensor 140 from the external apparatus 20, and the second communicator 120 may transmit information regarding remaining battery capacity, ambient temperature, ambient humidity, and event occurrence to the external apparatus 20.

When the second communicator 120 receives control information of the surveillance apparatus 10 from the external apparatus 20, the controller 160 may generate an interrupt. The interrupt generated by receiving the control information may temporarily stop a process that is being executed by the controller 160 and control the surveillance apparatus 10 and elements constituting the surveillance apparatus 10 according to the control information received through the second communicator 120. The control method will be described in detail below.

The second communicator 120 may be switched from a standby mode to an operating mode or from the operating mode to the standby mode by a type-3 interrupt generated by a second timer (not shown) distinct from the timer 130, which will be described below. In this case, the second timer (not shown) may periodically generate the type-3 interrupt and determine whether the control information is received from the external apparatus 20. In other words, the second communicator 120 may periodically determine whether the control information is received from the external apparatus 20 and generate a type-2 interrupt on the basis of the reception.

According to another exemplary embodiment, unlike the above-description, the second communicator 120 may always operate in the operating mode. This will be described in detail below.

Meanwhile, a period at which the second timer (not shown) generates an interrupt may be set by a user. For example, when a fast response of a surveillance apparatus to the user is needed, the period at which the second timer (not shown) generates the interrupt may be set to be short. In this case, power consumption may be large.

On the other hand, when a fast response of the surveillance apparatus to the user is not necessary, the period at which the second timer (not shown) generates the interrupt may be set to be long. In this case, power consumption may be reduced.

The timer 130 according to an exemplary embodiment may periodically generate an interrupt. The interrupt generated by the timer 130 may temporarily stop a process that is being executed by the controller 160 so that the controller 160 may perform a process associated with the interrupt generated by the timer 130.

Here, the timer 130 may be a timer counter included in a microprocessor (e.g., an MCU) constituting the controller 160. Furthermore, the interrupt generated by the timer 130 may stop a process being executed according to a certain prescaler ratio of the timer counter of the controller 160, that is, at time intervals each of which is obtained by dividing an operating frequency of the controller 160 by a certain integer so that the controller 160 may perform a process associated with the interrupt. The controller 160 may determine whether an event has occurred in a surveillance region whenever an interrupt is generated by the timer 130 and may send an image, which is acquired by the image sensor 140 when an event has occurred, to the external apparatus 20 through the first communicator 110.

The period at which the timer 130 generates the interrupt may be set by a user. For example, when the surveillance apparatus is installed in a surveillance region that requires strict surveillance, an interrupt generation period may be set to be short so that the controller 160 may frequently determine whether an event has occurred. In this case, power consumption of the surveillance apparatus 10 may be large.

On the other hand, when the surveillance apparatus 10 is installed in a surveillance region that requires weak surveillance, the interrupt generation period may be set to be long so that the controller 160 may determine whether an event has occurred over a long time period, and thus the power consumption of the surveillance apparatus 10 may be reduced.

The image sensor 140 according to an exemplary embodiment may acquire an image of a surveillance region. In detail, the image sensor 140 may image surrounding environments or a scene (space) and capture various objects (e.g., static objects such as a floor, a wall, and an obstacle and dynamic objects such as a person and an animal) in the scene.

The image sensor 140 may include a semiconductor device capable of converting an optical signal into an electric signal (hereinafter referred to as an image), such as a charge-coupled device (CCD) or a complementary metal oxide semiconductor (CMOS). The image created by the image sensor 140 may be sent to the external apparatus 20 through control of the controller 160 or transmission of the first communicator 110.

The controller 160 may supply power to the image sensor 140 or change a mode of the image sensor 140 from a standby (or sleep) mode to an operating mode only when the image sensor 140 captures an image, that is, when an event occurs. In other words, when the surveillance apparatus 10 does not captures an image, the controller 160 may shut off power that is supplied to the image sensor 140.

The detector 150 according to an exemplary embodiment may measure a physical quantity inside or outside the surveillance apparatus 10 and may be provided in plurality. The physical quantity measured by the detector 150 may be sent to the external apparatus 20 through control of the controller 160 or transmission of the second communicator 120.

For example, the detector 150 may be a temperature or humidity measuring unit. In this case, a temperature or humidity measured by the detector 150 may be used to determine whether the surveillance apparatus 10 malfunctions. Also, the measured temperature or humidity may be used by the surveillance apparatus 10 to determine whether an event has occurred. Furthermore, the temperature or humidity may also be used by the external apparatus 20 to check validity of an event occurrence alarm sent by the surveillance apparatus 10.

The detector 150 may be a voltage or current measuring unit. The surveillance apparatus 10 may be driven with a limited energy source such as a battery, and a remaining energy state of the energy source may be important information for operation of the surveillance apparatus 10. That is, the remaining capacity of the battery measured by the detector 150 that is a voltage or current measurement unit may be used by the controller 160 to control operation of the surveillance apparatus 10. Also, the remaining capacity may be sent to the external apparatus 20 through the second communicator 120. However, the above-described examples are merely illustrative, and thus the inventive concept is not limited thereto.

The detector 150 may also be a movement detection unit. The movement detection unit may be a motion sensor, an infrared sensor, an ultrasonic sensor, or a combination thereof. The controller 160 may receive movement detection data from the detector 150 that is a movement detection unit and determine whether an event has occurred on the basis of the received movement detection data.

The controller 160 may supply power to the detector 150 only when it is necessary for the detector 150 to perform detection. In other words, when it is not necessary for the detector 150 to perform detection, the controller 160 may shut off power to the detector 150. According to another exemplary embodiment to be described below, the controller 160 may always supply power to the detector 150.

The controller 160 according to an exemplary embodiment may control transmission or reception of data to or from the external apparatus 20 through the first communicator 110 and the second communicator 120. Also, the controller 160 may control connections among the first communicator 110, the second communicator 120, the image sensor 140, the detector 150, and the power supply source 170 to control power supplied to these elements.

In the related art, when power is applied to the surveillance apparatus 10, power is supplied to all elements thereof. Thus, even when a corresponding element is not required to operate, the element may consume power. For example, when only the image sensor 140, the controller 160, and the first communicator 110 are required to operate in order to send an image acquired by the image sensor 140 to the external apparatus 20, power is also supplied to the detector 150 which is not used in this operation, thus causing unnecessary power consumption.

The controller 160 according to an exemplary embodiment may minimize unnecessary power consumption by supplying or shutting off power to each element constituting the surveillance apparatus 10 as necessary. In detail, the controller 160 may shut off power to an element that is not used in a process being executed. In this case, the shut-off may mean supplying only the minimum power required when a corresponding elements enters a sleep mode or completely stopping supplying power to a corresponding element. The shut-off and supply method will be described in detail later with reference to FIGS. 5 to 12.

The controller 160 may process a type-1 interrupt generated by the timer 130 at a certain time period or a type-2 interrupt generated when the second communicator 120 receives control information from the external apparatus 20. In detail, the controller 160 may detect whether an interrupt is generated and determine a type of the interrupt. In this case, when the generated interrupt is a type-1 interrupt (i.e., the interrupt generated by the timer 130 at a certain time period, the controller 160 may determine whether an event has occurred on the basis of movement detection data received from the detector 150 which is a movement detection unit. When it is determined that an event has occurred, the controller 160 may send an event occurrence alarm to the external apparatus 20 through the second communicator 120, which transmits or receives data at the second frequency. Also, the controller 160 may send an image acquired by the image sensor 140 to the external apparatus 20 through the first communicator 110, which transmits or receives data at the first frequency.

When the generated interrupt is a type-2 interrupt (i.e., an interrupt generated when the second communicator 120 receives control information from the external apparatus 20), the controller 160 may control the surveillance apparatus 10 according to control the information that is received from the external apparatus 20 to generate the type-2 interrupt.

In this case, when setting information of the image sensor 140 is included in the control information that generates the type-2 interrupt, the controller 160 may change settings of the image sensor 140 according to the setting information. That is, the controller 160 may change the settings of the image sensor 140 according to the setting information of the image sensor 140 that is included in the control information received from the external apparatus 20.

As an example, when setting information regarding panning, tilting, and zooming of the image sensor 140 is included in the control information, the controller 160 may drive a driver (not shown) for driving the image sensor 140 according to the setting information regarding panning, tilting, and zooming.

As another example, when a request for status information request of the surveillance apparatus 10 is included in the control information, the controller 160 may send a physical quantity (e.g., temperature, humidity, voltage, etc.) acquired by the detector 150 to the external apparatus 20 through the second communicator 120.

When an interrupt is not detected, the controller 160 may shut off power to the image sensor 140 or set a mode of the image sensor 140 to a standby (or sleep) mode. Furthermore, the controller 160 may also shut off power to the first communicator 110 and the detector 150. When an interrupt is not detected, a power shut-off element in the surveillance apparatus 10 may be determined by a user. For example, when power is shut off to all elements except for essential elements, power consumption may be reduced. However, when each element is required to operate, an operational delay may occur due to booting of the element. When power is shut off to only elements other than some elements that are frequently used, power consumption may increase, and the above-described delay time may be shortened. This will be described in detail below with reference to FIGS. 5 to 12.

The power supply source 170 according to an exemplary embodiment may supply power to the surveillance apparatus 10. The power supply source 170 may be a power source connected to an external power supply source or may be a power source with a limited capacity, such as a battery.

<Interrupt Processing Method>

FIGS. 2 to 4B are diagrams for describing an interrupt processing method performed by the surveillance apparatus 10 (see FIG. 1) according to exemplary embodiments. What has been described with reference to FIG. 1 will not be repeatedly described in detail below.

Figure 2:
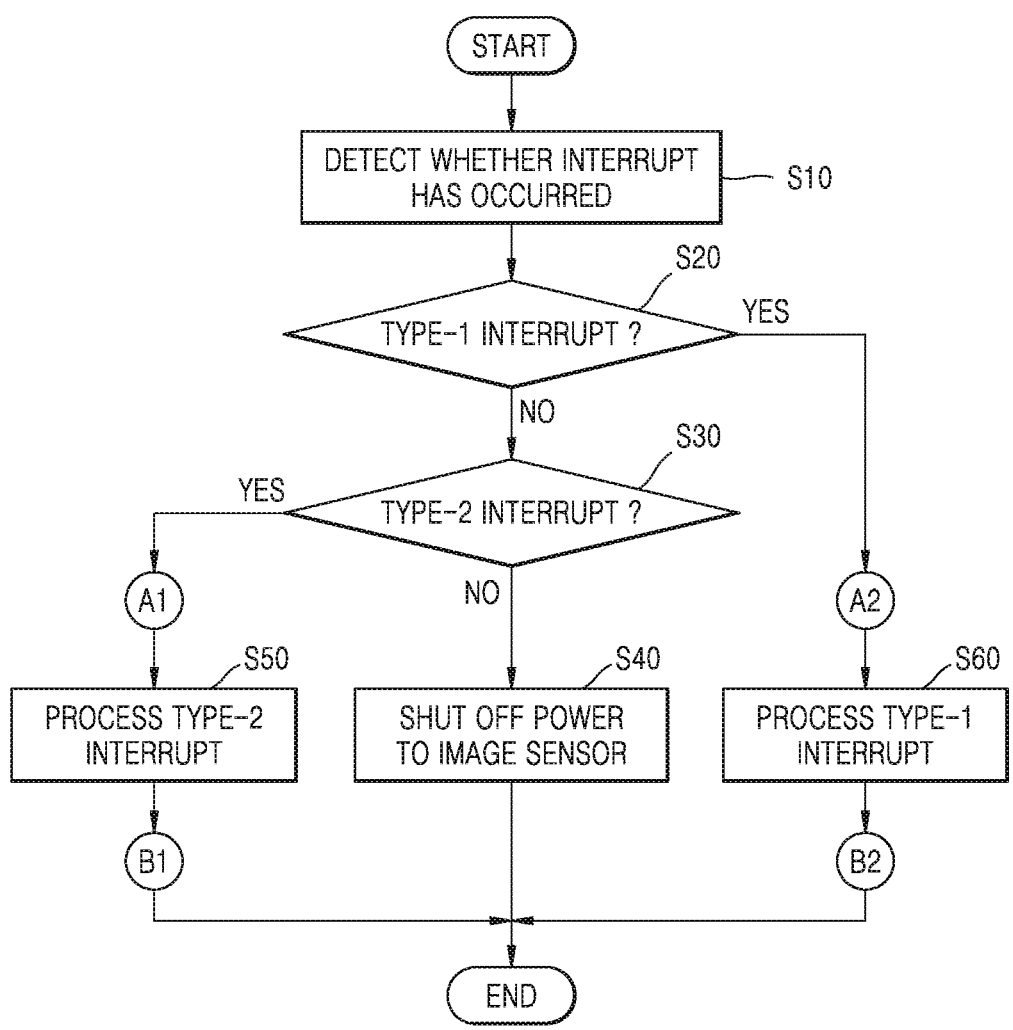
FIG. 2 schematically shows a surveillance method according to an exe exemplary embodiment.

FIG. 2 schematically shows a surveillance method according to an exemplary embodiment.

Referring to FIG. 2, the controller 160 may detect whether an interrupt is generated (S10). In detail, the controller 160 may detect a type-1 interrupt generated by the timer 130 at a certain time period or interval, or detect a type-2 interrupt generated when the second communicator 120 receives control information from the external apparatus 20.

The controller 160 determines whether the detected interrupt is a type-1 interrupt (S20). When the detected interrupt is a type-1 interrupt, the controller 160 may process the interrupt according to a type-1 interrupt processing method (S60). The type-1 interrupt processing method will be described in detail below with reference to FIG. 3.

When the detected interrupt is not a type-1 interrupt, the controller 160 determines whether the detected interrupt is a type-2 interrupt (S30). When the detected interrupt is a type-2 interrupt, the controller 160 may process the interrupt according to a type-2 interrupt processing method (S50). The type-2 interrupt processing method will be described in detail below with reference to FIGS. 4A to 4B.

Meanwhile, when an interrupt is not detected, the controller 160 may shut off power to the image sensor 140 (S40).

In a surveillance method according to another exemplary embodiment, detection of whether an interrupt is generated (S10) and determination of a type of the interrupt (S20, S30) may be performed in one operation. That is, in one operation, a controller 160 according to another exemplary embodiment may determine (1) a state in which a type-1 interrupt is generated, (2) a state in which a type-2 interrupt is generated, or (3) a state in which no interrupt is generated. When the controller 160 determines (1) the state in which a type-1 interrupt is generated and (2) the state in which a type-2 interrupt is generated, the controller 160 may process the interrupts according to the type-1 interrupt processing method (S60) and the type-2 interrupt processing method (S50), respectively, as described above. On the other hand, when the controller 160 determines (3) the state in which no interrupt is generated, the controller 160 may shut off power to the image sensor 140.

Figure 3:
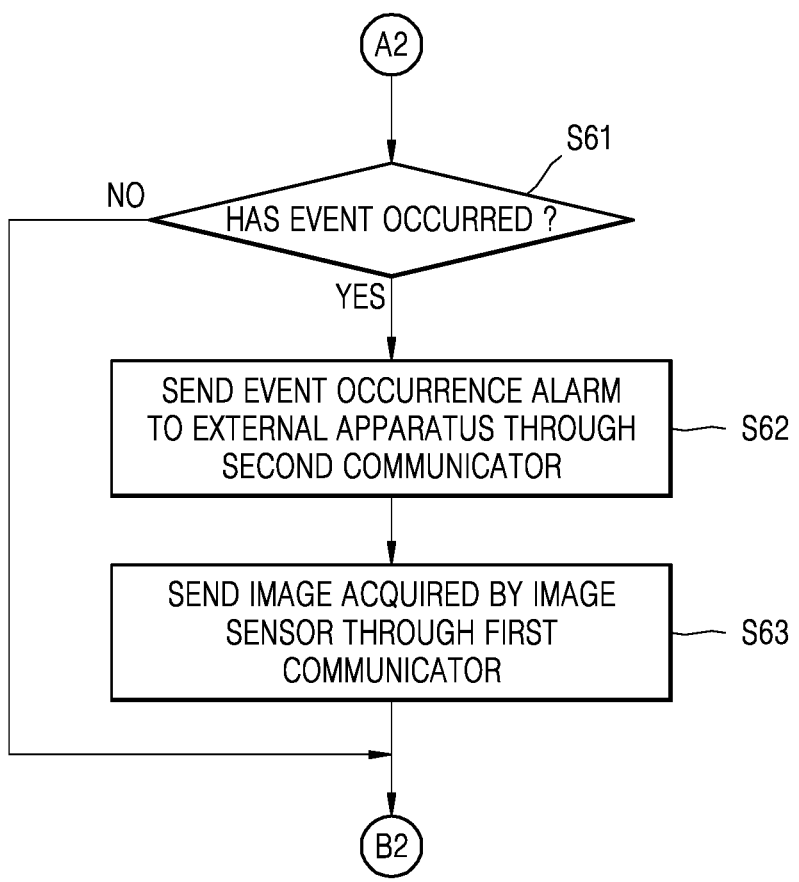
FIG. 3 schematically shows a method in which a controller processes a type-1 interrupt according to an exemplary embodiment.

FIG. 3 schematically shows a method in which the controller 160 processes a type-1 interrupt according to an exemplary embodiment (operation S60 of FIG. 2).

Referring to FIG. 3, when a type-1 interrupt is detected, the controller 160 may detect whether an event has occurred using the detector 150 (S61). For example, the controller 160 may determine whether an event has occurred on the basis of movement detection data received from a movement detector, which is a type of the detector 150. In this case, the movement detector may be a motion sensor, an infrared sensor, an ultrasonic sensor, or a combination thereof.

The controller 160 may temporarily supply power of the power supply source 170 to the detector 150 to detect whether an event has occurred. Here, the temporary power supply may mean that power is supplied to the detector 150 only when the detector 150 is required to detect whether an event has occurred. As described above, the controller 160 may temporarily supply power to the detector 150 and shut off the power when the detector 150 is not required to operate, thus decreasing power consumption.

When the detector 150 determines that an event has occurred, the controller 160 may send an event occurrence alarm to the external apparatus 20 through the second communicator 120, which transmits or receives data at the second frequency (S62). When the alarm is sent to the external apparatus 20, the external apparatus 20 may warn an administrator that the event has occurred.

Also, the controller 160 may send an image acquired by the image sensor 140 to the external apparatus 20 through the first communicator 110, which transmits or receives data at the first frequency (S63). A user may check detailed image information regarding an event occurrence by checking the image sent to the external apparatus 20.

In summary, the controller 160 may control a power source to supply power to the detector 150 and shut off the power to the detector 150 after determining whether an event has occurred and to supply power to the second communicator 120 and the first communicator 110 to send an event occurrence alarm and an image acquired by the image sensor 140 to the external apparatus 20, respectively. It should be appreciated that the controller 160 may shut off the power to the second communicator 120 and the first communicator 110 when the provision of the event occurrence alarm and the image is complete.

Figure 4A:
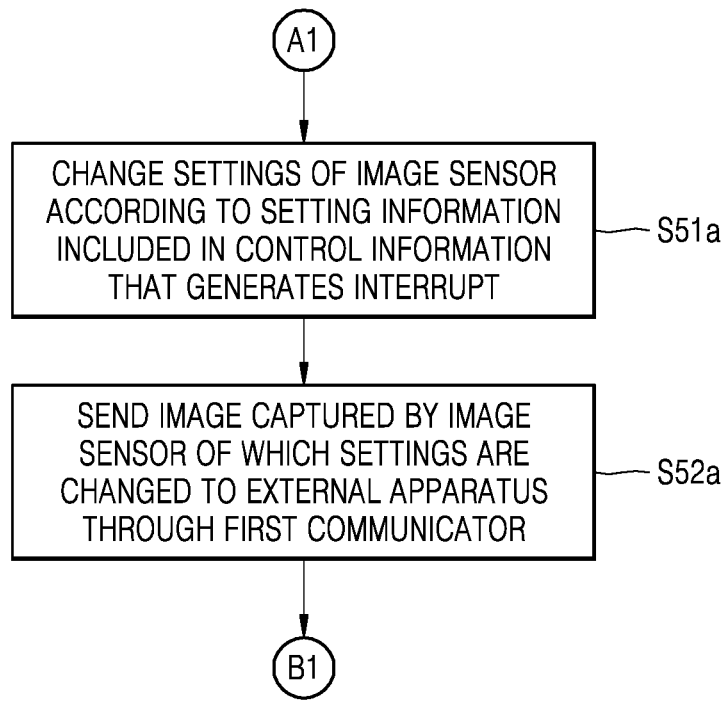
FIG. 4A schematically shows an example in which control information included in a type-2 interrupt contains setting information of an image sensor.
Figure 4B:
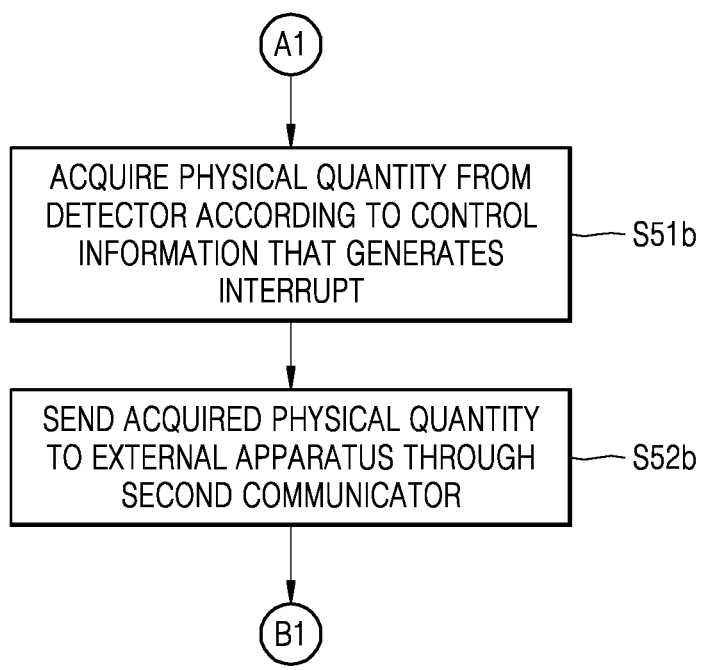
FIG. 4B schematically shows an example in which control information included in a type-2 interrupt contains a request for status information request of a surveillance apparatus.

FIGS. 4A and 4B schematically show a method in which the controller 160 processes a type-2 interrupt according to an exemplary embodiment (operation S50 of FIG. 2).

FIG. 4A schematically shows an example in which control information included in a type-2 interrupt contains setting information of the image sensor 140. When the setting information of the image sensor 140 is included in control information that generates the type-2 interrupt, the controller 160 may change settings of the image sensor 140 according to the setting information (S51a). That is, the controller 160 may change the settings of the image sensor 140 according to the setting information of the image sensor 140 that is included in the control information received from the external apparatus 20. As an example, when setting information regarding panning, tilting, and zooming of the image sensor 140 is included in the control information, the controller 160 may drive a driver (not shown) for driving the image sensor 140 according to the setting information regarding panning, tilting, and zooming.

The controller 160 may send an image captured by the image sensor 140 of which settings are changed to the external apparatus 20 through the first communicator 110 (S52a). A user may check how well the image sensor 140 is set by checking the image captured by the image sensor 140 of which settings are changed from the external apparatus 20.

In this case, the controller 160 may supply power to the driver (not shown) and the image sensor 140, and shut off the power to the driver (not shown) and the image sensor 140 when the setting is complete.

FIG. 4B schematically shows an example in which control information included in a type-2 interrupt contains a request for status information request of the surveillance apparatus 10 (operation S50 of FIG. 2). When a request for status information of the surveillance apparatus 10 is included in the control information that generates the type-2 interrupt, the controller 160 may acquire a physical quantity measured by the detector 150 from the detector 150 (S51b).

In this case, the detector 150 may be, for example, a temperature or humidity measuring unit. In this case, a temperature or humidity measured by the detector 150 may be used to determine whether the surveillance apparatus 10 malfunctions.

Alternatively, the detector 150 may be an element for measuring voltage or current. The surveillance apparatus 10 may be driven as a limited energy source such as a battery, and a remaining energy state of the energy source may be important information for operation of the surveillance apparatus 10.

The controller 160 may send the acquired physical quantity to the external apparatus 20 through the second communicator 120 (S52b). The sent physical quantity may be used by the external apparatus 20 to check validity of an event occurrence alarm sent by the surveillance apparatus 10 and check status of the surveillance apparatus 10. In this case, the controller 160 may temporarily supply power to the detector 150 to acquire the physical quantity.

<Power Management Method>

FIGS. 5 to 12 are diagrams for describing a power management method performed by the surveillance apparatus 10 (see FIG. 1) according to exemplary embodiments. What has been described with reference to FIGS. 1 to 4B will not be repeatedly described in detail below.

FIG. 5 is a diagram for describing a mode of each element and whether power is supplied to each element over time when the detector 150 detects an event.

As described above, it is assumed that the timer 130 generates a type-1 interrupt at a certain time period T.

In this case, as shown in FIG. 5, when a type-1 interrupt is generated by the timer 130 at time t1, the controller 160 may be switched from a standby mode to an operating mode.

The controller 160 may supply power to the detector 150 at time t2 when the controller 160 is switched to the operating mode, and the detector 150 may create movement detection data and send the created movement detection data to the controller 160 when the power is supplied to the detector 150. When the detector 150 completes the creation of the movement detection data, the controller 160 may shut off the power to the detector 150 at time t3.

Next, the controller 160 may determine whether an event has occurred on the basis of the movement detection data received from the detector 150 and may supply power to the image sensor 140 at time t4 and supply power to the first communicator 110 at time t5. It should be appreciated that the controller 160 may switch the second communicator 120 from the standby mode to the operating mode at time t5 as necessary. Meanwhile, time t4 at which the controller 160 supplies power to the image sensor 140 and time t5 at which the controller 160 supplies power to the first communicator 110 may be the same or different from each other. Furthermore, an interval between time t4 and time t5 may be set in consideration of performance of the image sensor 140 and the first communicator 110.

The image sensor 140, the first communicator 110, and the second communicator 120 may send information regarding the event that has occurred to the external apparatus 20 when power is supplied to the image sensor 140, the first communicator 110, and the second communicator 120.

Figure 6:
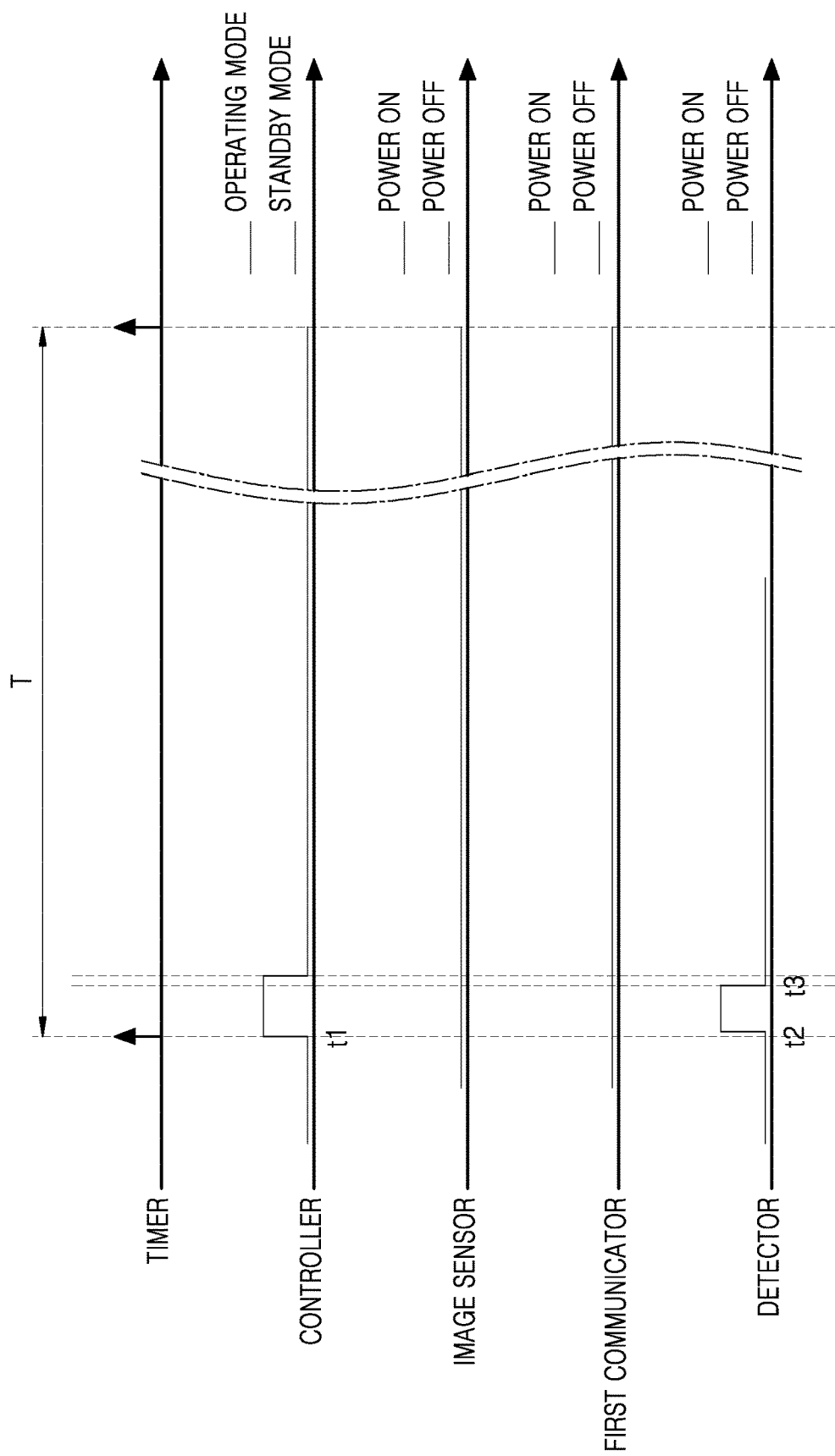
FIG. 6 is a diagram for describing a mode of each element and whether power is supplied to each element over time when a detector does not detect an event, according to an exemplary embodiment.

FIG. 6 is a diagram for describing a mode of each element and whether power is supplied to each element over time when the detector 150 does not detect an event.

As described above, it is assumed that the timer 130 generates a type-1 interrupt at a certain time period T.

In this case, as shown in FIG. 6, when a type-1 interrupt is generated by the timer 130 at time t1, the controller 160 may be switched from the standby mode to the operating mode.

The controller 160 may supply power to the detector 150 at time t2 when the controller 160 is switched to the operating mode, and the detector 150 may create movement detection data and send the created movement detection data to the controller 160 when the power is supplied to the detector 150. When the detector 150 completes the creation of the movement detection data, the controller 160 may shut off the power to the detector 150 at time t3.

Next, the controller 160 may determine whether an event has occurred on the basis of the movement detection data received from the detector 150 and return to the standby mode when it is determined that an event has not occurred.

As described above, according to an exemplary embodiment, it is possible to minimize power consumption of each unit and obtain a long life of the surveillance apparatus 10.

Figure 7:
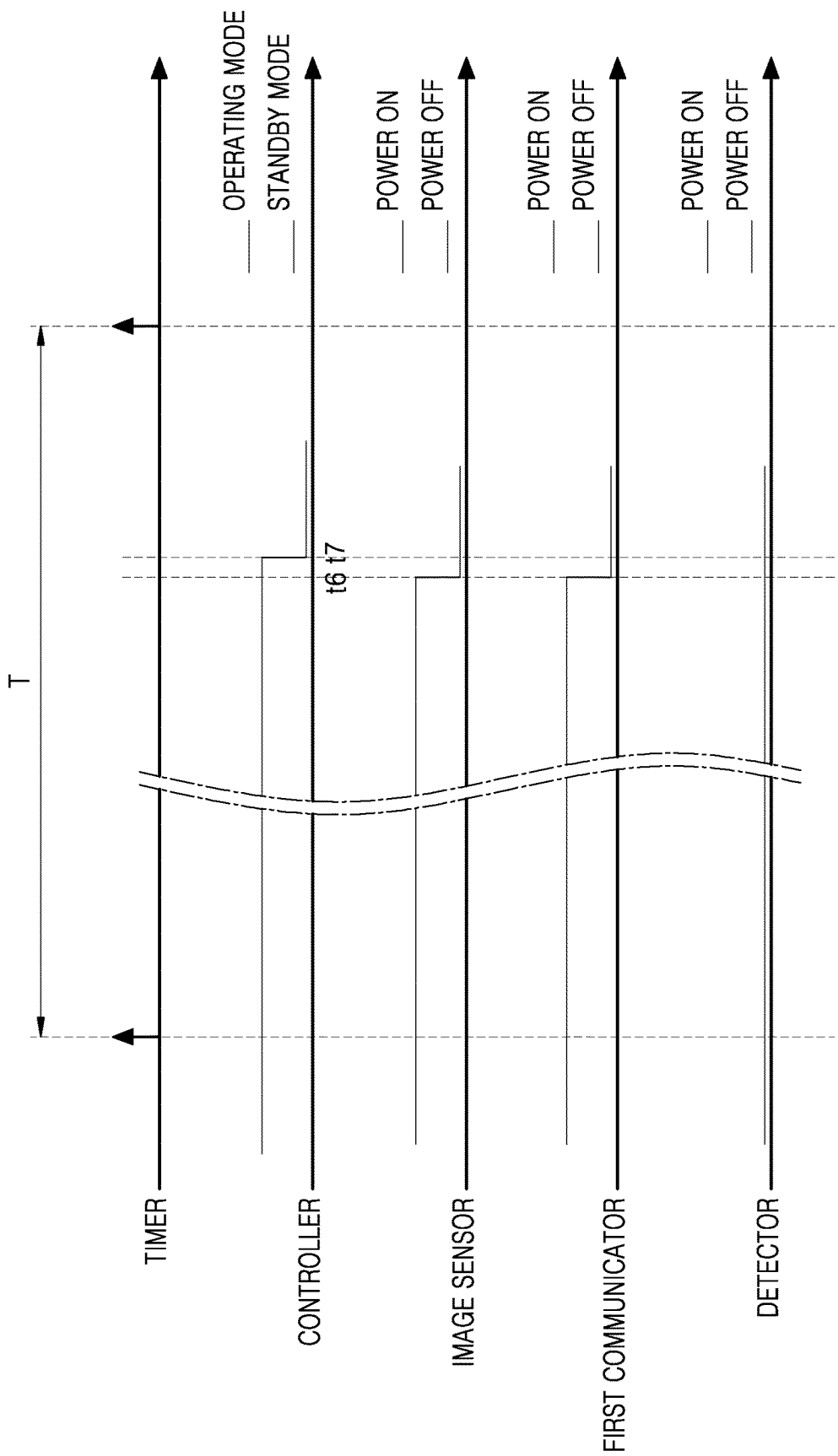
FIG. 7 is a diagram for describing a mode of each element and whether power is supplied to each element over time when a controller completes operations associated with an event that has occurred, according to an exemplary embodiment.

FIG. 7 is a diagram for describing a mode of each element and whether power is supplied to each element over time when the controller 160 completes operations associated with an event that has occurred.

The controller 160 of the surveillance apparatus 10 according to an exemplary embodiment may switch the controller 160 from the operating mode to the standby mode when the surveillance apparatus 10 satisfies a predetermined condition. Here, the predetermined condition may be variously set depending on the configuration of the surveillance apparatus 10. For example, the predetermined condition is a certain time (e.g., 300 sec) passing after the detector 150, which has been described above, detects an event.

For example, when the surveillance apparatus 10 satisfies the predetermined condition at time t6, the controller 160 may shut off power to the image sensor 140 and the first communicator 110 at time t6. Also, the controller 160 may be switched to the standby mode at time t7.

As described above, according to an exemplary embodiment, when the processing of the event is complete, a mode of each element and whether power is supplied to each element may be appropriately changed to efficiently use energy.

Figure 8:
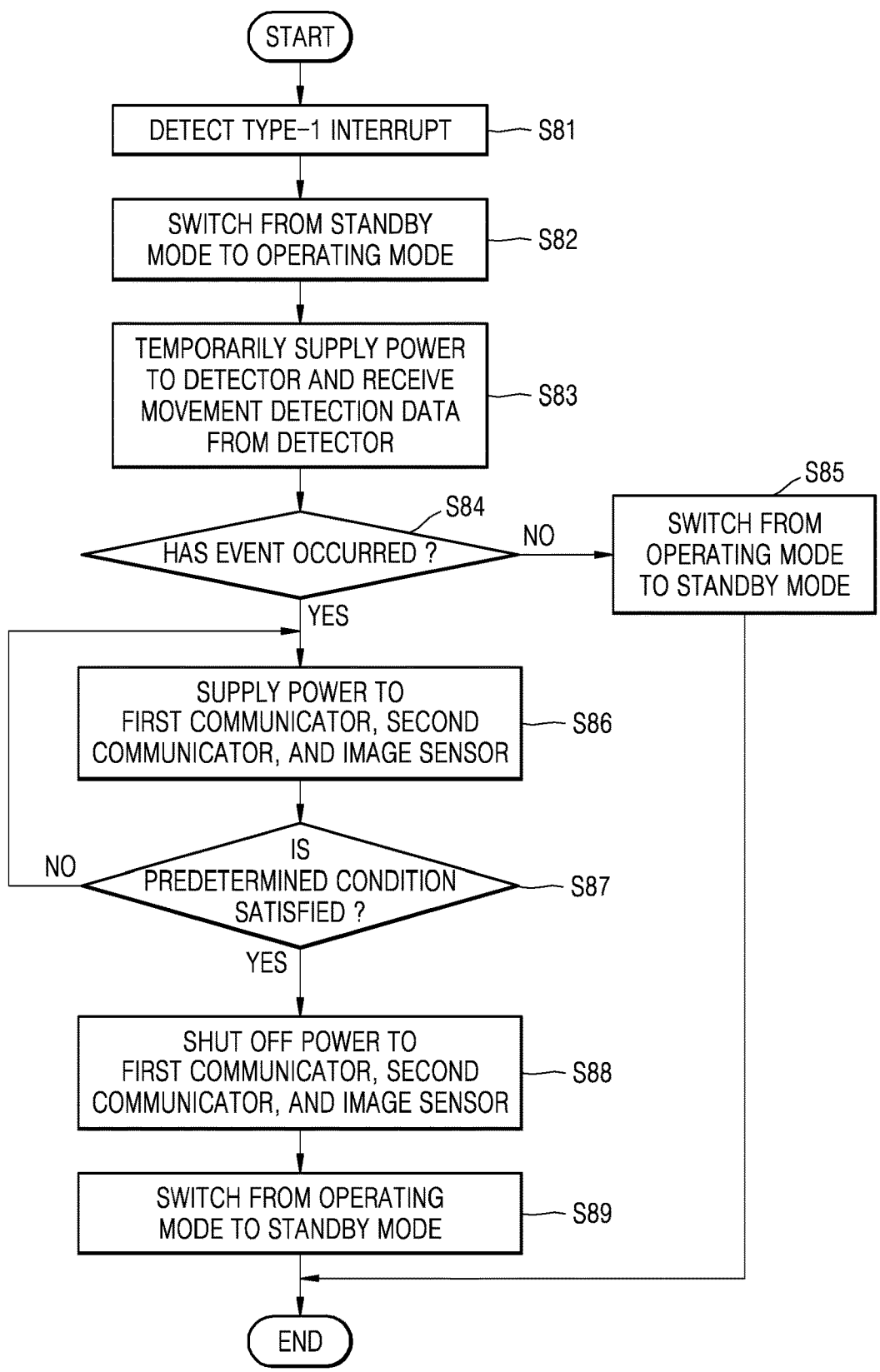
FIG. 8 is a flowchart for describing operation of the controller of FIGS. 5 to 7, according to exemplary embodiments.

FIG. 8 is a flowchart for describing operation of the controller 160 of FIGS. 5 to 7.

When a type-1 interrupt is generated (S81), the controller 160 according to an exemplary embodiment may be switched from a standby mode to an operating mode (S82).

When the controller 160 is switched to the operating mode, the controller 160 may temporarily supply power to the detector 150 and receive movement detection data from the detector 150 (S83). In more detail, the controller 160 may supply power to the detector 150 when the controller 160 is switched to the operating mode, and the detector 150 may create the movement detection data and send the created movement detection data to the controller 160 when the power is supplied to the detector 150. When the detector 150 completes the creation and sending of the movement detection data, the controller 160 may shut off the power to the detector 150.

Next, the controller 160 may determine whether an event has occurred on the basis of the movement detection data received from the detector 150 (S84) and may supply power to the image sensor 140 and supply power to the first communicator 110 when it is determined that an event has occurred (S86). It should be appreciated that the controller 160 may switch the second communicator 120 from a standby mode to an operating mode as necessary. The image sensor 140, the first communicator 110, and the second communicator 120 may send information regarding the event that has occurred to the external apparatus 20 when power is supplied to the image sensor 140, the first communicator 110, and the second communicator 120.

The controller 160 according to an exemplary embodiment determines whether the surveillance apparatus 10 satisfies a predetermined condition (S87) and may shut off the power to the image sensor 140, the first communicator 110, and the second communicator 120 when the surveillance apparatus 10 satisfies the predetermined condition (S88). Also, the controller 160 may be switched to the standby mode (S89).

When it is determined that the event has not occurred in operation S84, which has been described above, the controller 160 may be switched to the standby mode (S85).

As described above, according to an exemplary embodiment, when the processing of the event is complete, a mode of each element and whether power is supplied to each unit may be appropriately changed to efficiently use energy.

Figure 9:
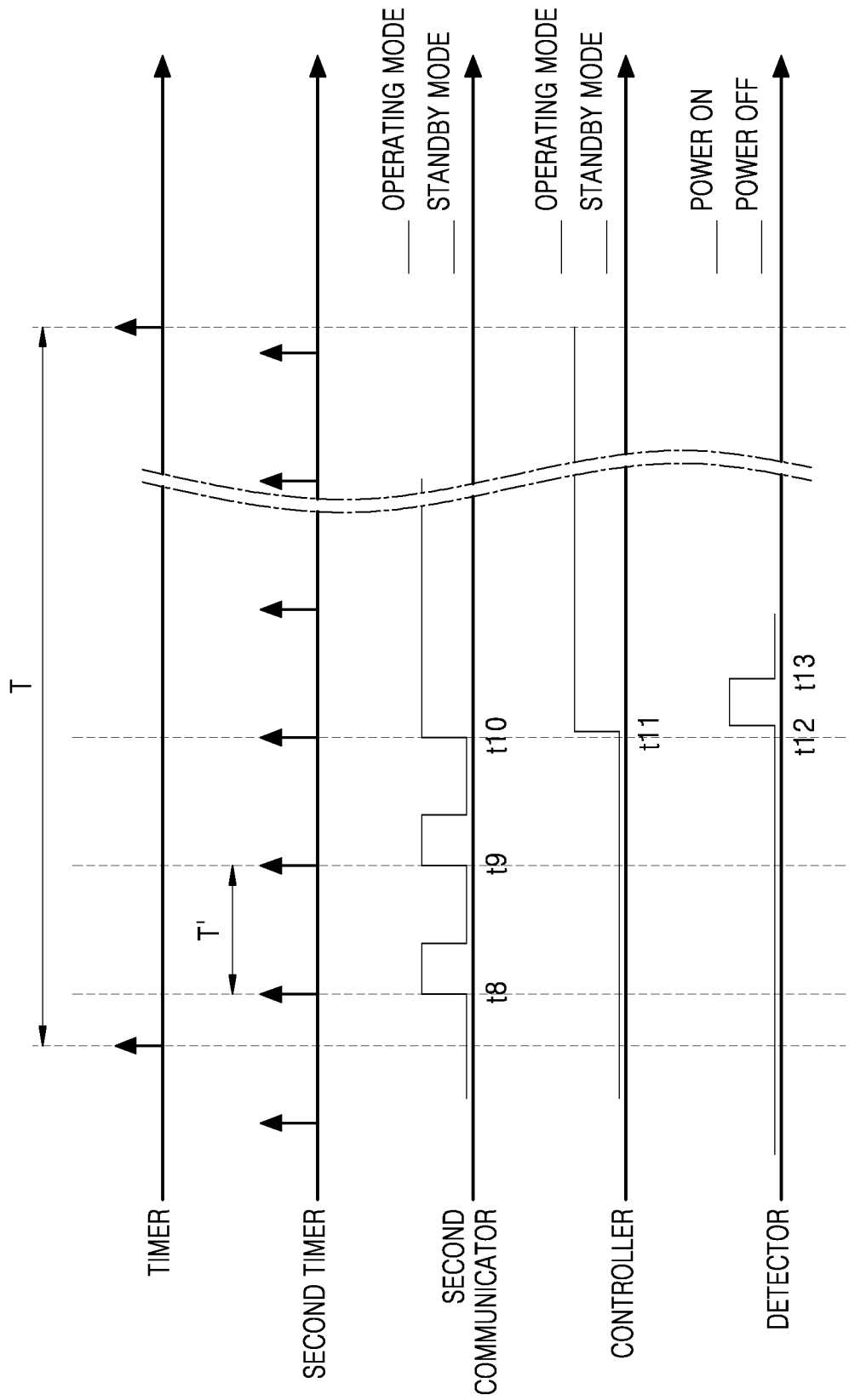
FIG. 9 is a diagram for describing operation of a surveillance apparatus by a second communicator, according to another exemplary embodiment.

FIG. 9 is a diagram for describing operation of the surveillance apparatus 10 by the second communicator 120 according to another exemplary embodiment.

The second communicator 120 according to another exemplary embodiment may be switched from a standby mode to an operating mode or from the operating mode to the standby mode according to a type-3 interrupt. Here, the type-3 interrupt may be an interrupt that is generated at a certain time period T' by a second timer (not shown) different from the above-described timer 130.

The second communicator 120 according to another exemplary embodiment may receive control information from the external apparatus 20 when the second communicator 120 is in the operating mode.

For example, as shown in FIG. 9, it is assumed that the type-3 interrupt has been generated by the second timer (not shown) at time t8, time t9, and time t10 and also that the external apparatus 20 has sent control information to the surveillance apparatus 10 at time t9 and time t10.

Under the above assumptions, when the second communicator 120 is switched from the standby mode to the operating mode at time t10, the second communicator 120 receives a control signal that was transmitted by the external apparatus 20 before time t10. Thus, the controller 160 may be switched to the operating mode at time t11.

When the controller 160 is switched to the operating mode, the controller 160 may perform processing according to the control signal received from the external apparatus 20. In more detail, the controller 160 may determine an element corresponding to the control signal received from the external apparatus 20 and may switch a mode of the determined element or change whether to supply power to the element. In this case, the element may be one of the first communicator 110, the image sensor 140, and the detector 150 of the surveillance apparatus 10.

For example, as described above, when the control signal is "determine whether an event is detected," the controller 160 may supply power to the detector 150 at time t12, and the detector 150 may create movement detection data and send the created movement detection data to the controller 160. Subsequently, when the detector 150 completes the creation and sending of the movement detection data, the controller 160 may shut off the power to the detector 150 at time t13 again.

Thus, according to an exemplary embodiment, it is possible to efficiently respond to the control signal of the external apparatus 20 in terms of energy.

Figure 10:
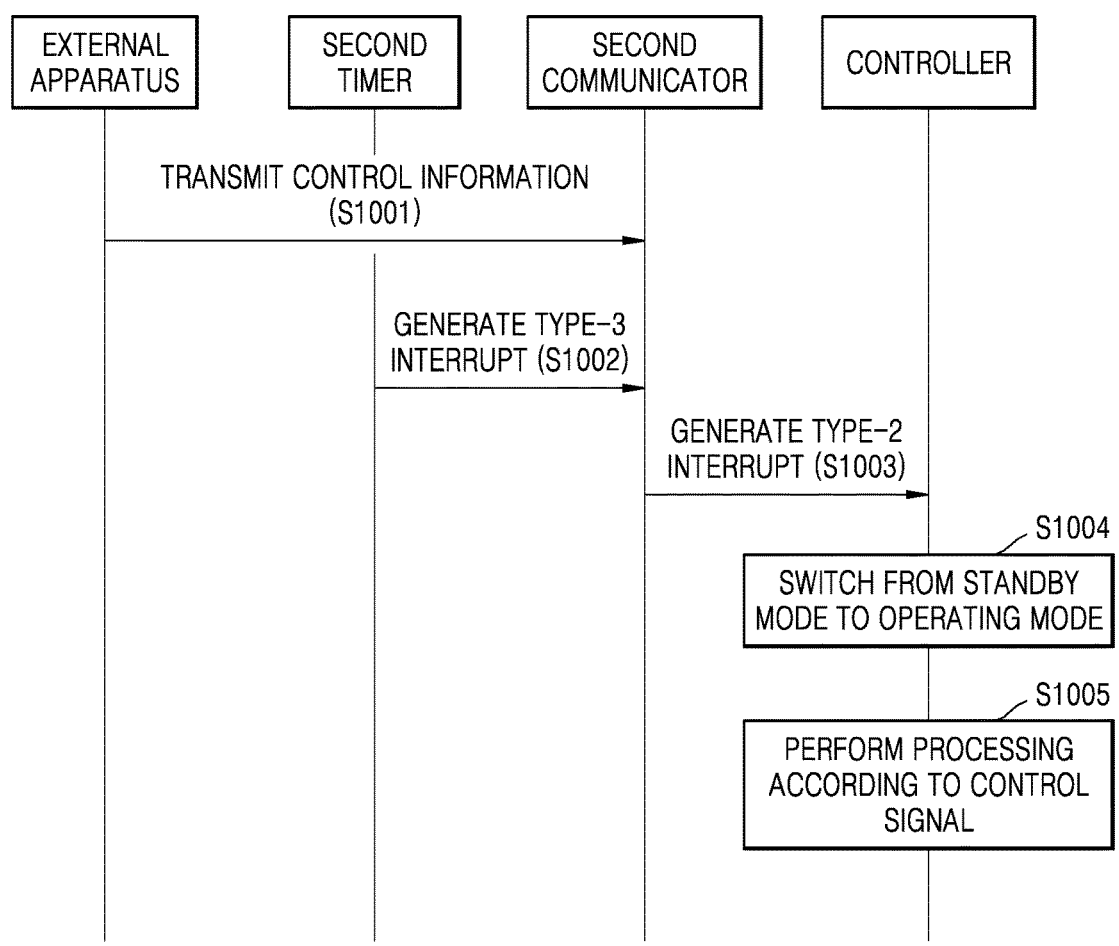
FIG. 10 is a sequence diagram for describing operation of a controller of FIG. 9, according to an exemplary embodiment.

FIG. 10 is a sequence diagram for describing operation of the controller 160 that has been described with reference to FIG. 9.

First, the external apparatus 20 may send control information to the surveillance apparatus 10 according to an exemplary embodiment (S1001).

Next, the second communicator 120 according to another exemplary embodiment may be switched from a standby mode to an operating mode or from the operating mode to the standby mode according to a type-3 interrupt (S1002). Here, the type-3 interrupt may be an interrupt that is generated at a certain time period T' by a second timer (not shown) different from the above-described timer 130.

The second communicator 120 according to another exemplary embodiment may receive the control information from the external apparatus 20 when the second communicator 120 is in the operating mode.

When the second communicator 120 is switched from the standby mode to the operating mode, the second communicator 120 may receive the control information from the external apparatus 20 and generate a type-2 interrupt in response to the received control information (S1003).

The controller 160 according to another exemplary embodiment may be switched from the standby mode to the operating mode by the type-2 interrupt (S1004). Next, the controller 160 may perform processing according to the control signal received from the external apparatus 20

(S1005). For example, as described above, when the control signal is "determine whether an event is detected," the controller 160 may supply power to the detector 150, and the detector 150 may create movement detection data and send the created movement detection data to the controller 160. Subsequently, when the detector 150 completes the creation and sending of the movement detection data, the controller 160 may shut off the power to the detector 150.

Thus, according to an exemplary embodiment, it is possible to efficiently respond to the control signal of the external apparatus 20 in terms of energy.

Figure 11:
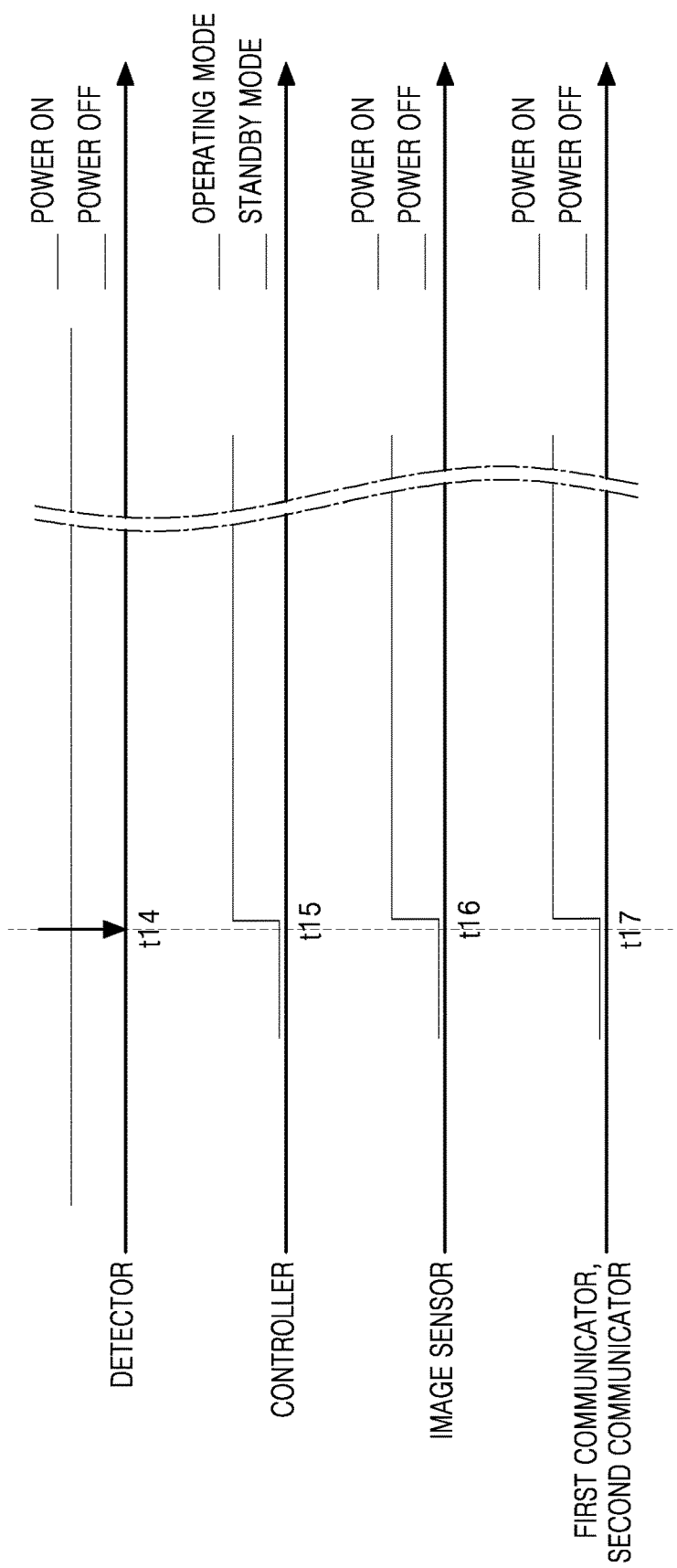
FIG. 11 is a diagram for describing operation of a surveillance apparatus by a detector, according to another exemplary embodiment.

FIG. 11 is a diagram for describing operation of the surveillance apparatus 10 by the detector 150 according to another exemplary embodiment.

In the above-described example, the controller 160 may control supply and shut-off of power to the detector 150 as necessary. However, in this exemplary embodiment, power is always supplied to the detector 150. Accordingly, according to this exemplary embodiment, it is possible to change modes of the controller 160 and other elements, and power is supplied to the controller 160 and the other elements depending on whether the detector 150 detects an event.

To this end, when the detected interrupt is a type-4 interrupt, the controller 160 according to an exemplary embodiment may send an event occurrence alarm to the external apparatus 20 through the second communicator 120. Also, the controller 160 may send an image acquired by the image sensor 140 to the external apparatus 20 through the first communicator 110. Here, the type-4 interrupt may be an interrupt generated by the detector 150 when the detector 150 detects an event.

For example, when an event has occurred at time t14, power is always supplied to the detector 150. Thus, the detector 150 may detect the event instantly, that is, at time t14.

When the event is detected, the detector 150 may switch the controller 160 from a standby mode to an operating mode at time t15.

When the controller 160 is switched to the operating mode, the controller 160 may supply power to the image sensor 140 at time t16 and may supply power to the first communicator 110 at time t17. It should be appreciated that the controller 160 may switch the second communicator 120 from a standby mode to an operating mode at time t17 as necessary. Meanwhile, time t16 at which the controller 160 supplies power to the image sensor 140 and time t17 at which the controller 160 supplies power to the first communicator 110 may be the same or different from each other. Furthermore, an interval between time t16 and time t17 may be set in consideration of performance of the image sensor 140 and the first communicator 110.

When the second communicator 120 is switched to the operating mode, the second communicator 120 may send an event occurrence alarm to the external apparatus 20, as described above. Also, the second communicator 120 may receive transmission request information regarding an image from the external apparatus 20. The controller 160 may send the image to the external apparatus 20 through the first communicator 110 with reference to the received transmission request information.

Thus, according to an exemplary embodiment, it is possible to quickly manage an event occurrence.

Figure 12:
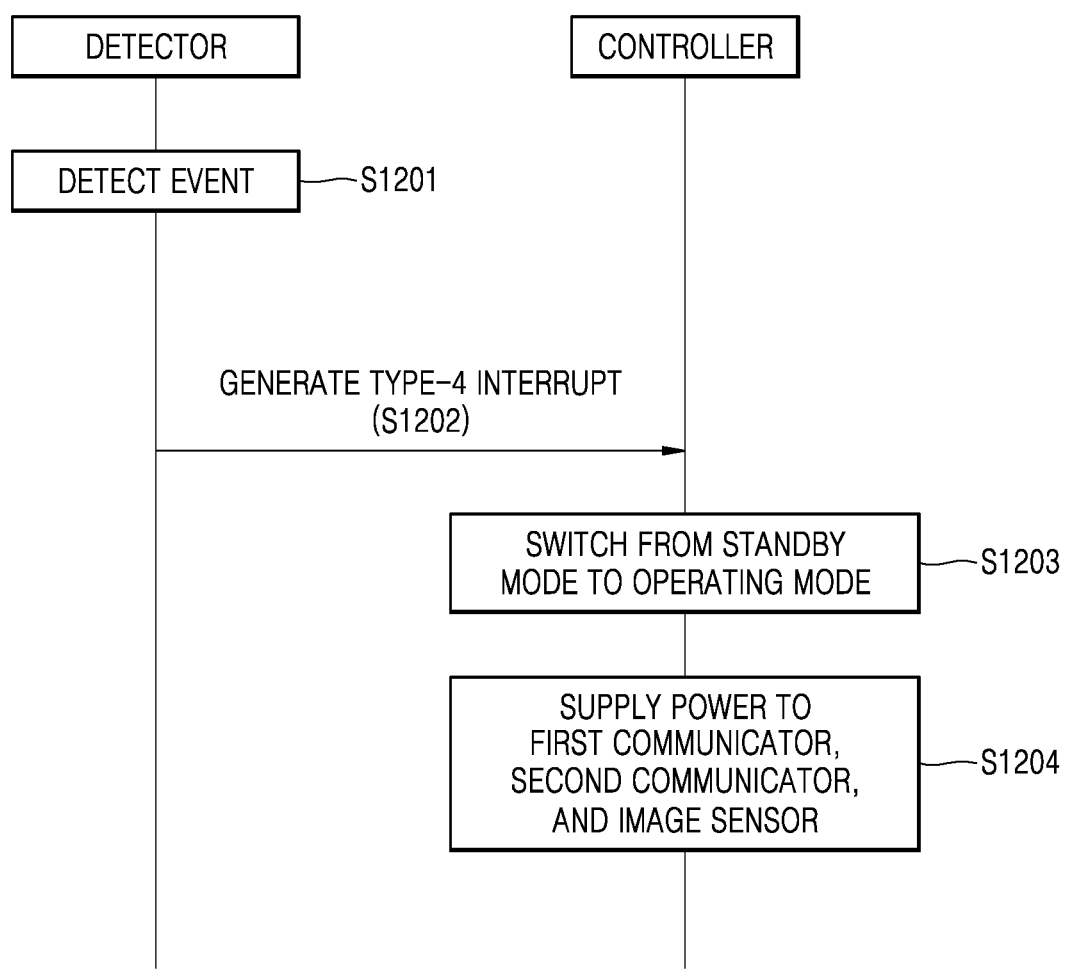
FIG. 12 is a sequence diagram for describing operation of a controller of FIG. 11.

FIG. 12 is a sequence diagram for describing operation of the controller 160 that has been described with reference to FIG. 11.

The detector 150 according to another embodiment may detect an event (S1201). In this case, power may always be supplied to the detector 150.

The detector 150 according to another exemplary embodiment may generate a type-4 interrupt in response to the detected event (S1202).

When the controller 160 detects the type-4 interrupt, the controller 160 according to another exemplary embodiment may be switched from a standby mode to an operating mode (S1203). Next, the controller 160 may supply power to the first communicator 110, the second communicator 120, and the image sensor 140 (S1204). Subsequently, the controller 160 may send an event occurrence alarm to the external apparatus 20 through the second communicator 120. Also, the controller 160 may send an image acquired by the image sensor 140 to the external apparatus 20 through the first communicator 110.

The surveillance method according to an exemplary embodiment can also be embodied as computer-readable codes on a computer-readable recording medium. The computer-readable recording medium includes any kind of recording device for storing data that can be read by a computer system. Examples of the computer-readable recording medium include a read-only memory (ROM), a random-access memory (RAM), a CD-ROM, a magnetic tape, a floppy disk, and an optical storage device. Also, the computer-readable recording medium may be distributed in computer systems connected via a network, and the computer-readable codes may be stored and executed in a distributed manner. Also, functional programs, codes and code segments for implementing the present invention may be easily construed by programmers skilled in the art to which the present invention pertains.

At least one of the components, elements, modules or units represented by a block as illustrated in FIG. 1 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

According to embodiments, it is possible to implement a surveillance apparatus capable of efficiently handling power by including a communicator configured to transmit or receive a large volume of data at high speed and a communicator configured to transmit or receive a small volume of data with low power.

It is also possible to implement a surveillance apparatus that may minimize power consumption by temporarily supplying power only to an element associated with a corresponding interrupt when an interrupt is detected.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A surveillance method performed by a surveillance apparatus, the surveillance method comprising:
    an interrupt processing operation of determining whether an interrupt is generated and determining a type of the interrupt;
    a type-1 interrupt processing operation of, in response to determining that the interrupt is a type-1 interrupt, determining whether an event has occurred, and, in response to determining that the event has occurred, sending an event occurrence alarm to an outside of the surveillance apparatus using a second communicator, which transmits or receives data at a second frequency, and sending an image, corresponding to the event, acquired by an image sensor to the outside using a first communicator, which transmits or receives data at a first frequency higher than the second frequency; and
    a type-2 interrupt processing operation of, in response to determining that the interrupt is a type-2 interrupt, controlling the surveillance apparatus according to control information included in the type-2 interrupt,
    wherein the type-1 interrupt is an interrupt generated at a predetermined time interval, and
    wherein the type-1 interrupt processing operation comprises:
        in response to determining that the interrupt is the type-1 interrupt, switching a power-off state of at least one detector included in or connected to the surveillance apparatus to a power-on state, the at least one detector configured to generate detection data, and
        in response to determining that the event has occurred based on the detection data, switching power-off states of the first communicator and the image sensor to power-on states.

2. The surveillance method of claim 1, wherein the type-2 interrupt processing operation comprises:
    in response to determining that the control information includes setting information of the image sensor, changing a setting of the image sensor according to the setting information; and
    sending an image captured by the image sensor of which the setting is changed to an external apparatus using the first communicator.

3. The surveillance method of claim 1, wherein, in response to determining that the control information includes a request for status information of the surveillance apparatus, the type-2 interrupt processing operation comprises sending a physical quantity acquired by the at least one detector to an external apparatus using the second communicator.

4. The surveillance method of claim 1, further comprising a wake-up operation of switching a controller of the surveillance apparatus from a standby mode to an operating mode in response to generation of at least one of the type-1 interrupt and the type-2 interrupt.

5. The surveillance method of claim 1, wherein the type-2 interrupt processing operation comprises:
    determining an element, included in or connected to the surveillance apparatus, corresponding to the control information; and
    switching an operation mode of the determined element or determining whether to supply power to the determined element; and
    wherein the element is at least one of the first communicator, the image sensor, and the at least one detector.

6. The surveillance method of claim 1, further comprising, after the type-1 interrupt processing operation or the type-2 interrupt processing operation, switching a controller of the surveillance apparatus controlling the type-1 and the type-2 interrupt processing operations from an operating mode to a standby mode in response to determining that the surveillance apparatus satisfies a predetermined condition.

7. The surveillance method of claim 1, further comprising:
    switching a mode of the second communicator of the surveillance apparatus, from a standby mode to an operating mode or from the operating mode to the standby mode, according to a type-3 interrupt,
    wherein the type-3 interrupt is an interrupt generated by a second timer different from a timer used for generating the type-1 interrupt at a certain time period.

8. The surveillance method of claim 1, further comprising a type-4 interrupt processing operation of, in response to determining that the interrupt is the type-4 interrupt, sending another event occurrence alarm to the outside using the second communicator and sending another image, corresponding to the other event, acquired by the image sensor to the outside using the first communicator,
    wherein the type-4 interrupt is an interrupt generated in response to detecting occurrence of the other event.

9. The surveillance method of claim 1, wherein the type-1 interrupt processing operation comprises:
    receiving transmission request information of the image from the outside using the second communicator; and
    sending the image to the outside using the first communicator in response to the transmission request information.

10. A surveillance apparatus comprising:
    a first communicator configured to transmit or receive data to or from an outside of the surveillance apparatus at a first frequency;
    a second communicator configured to transmit or receive data to or from the outside of the surveillance apparatus at a second frequency lower than the first frequency;
    a timer configured to periodically generate a type-1 interrupt; and
    a controller configured to control transmission or reception of the data through the first communicator and the second communicator, and detect the interrupt,
    wherein the controller determines whether an event has occurred in response to the controller detecting the type-1 interrupt generated by the timer, and, in response to determining that the event has occurred, sends an event occurrence alarm to the outside through the second communicator and sends an image, corresponding to the event, acquired by an image sensor to the outside through the first communicator, wherein in response to the controller detecting a type-2 interrupt generated, the controller controls operation of at least one of the first communicator, the second communicator, the image sensor, and at least one detector configured to generate detection data, according to control information included in the type-2 interrupt, and wherein the controller is further configured to:
in response to determining that the interrupt is the type-1 interrupt, switch a power-off state of at least one detector included in or connected to the surveillance apparatus to a power-on state, and
in response to determining that the event has occurred based on the detection data, switch power-off states of the first communicator and the image sensor to power-on states.

11. The surveillance apparatus of claim 10, wherein in response to determining that the control information includes setting information of the image sensor, the controller changes a setting of the image sensor according to the setting information.

12. The surveillance apparatus of claim 10, wherein in response to determining that at least one of the type-1 interrupt and the type-2 interrupt is generated, the controller is switched from a standby mode to an operating mode.

13. The surveillance apparatus of claim 10, wherein the controller determines at least one element, included in or connected to the surveillance apparatus, corresponding to the control information and switches an operation mode of the determined at least one element or determining whether to supply power to the determined at least one element, and
wherein the at least one element comprises at least one of the first communicator, the image sensor, and the at least one detector.

14. The surveillance apparatus of claim 10, wherein the controller is switched from an operating mode to a standby mode in response to determining that the surveillance apparatus satisfies a predetermined condition.

15. The surveillance apparatus of claim 10, wherein the second communicator receives a type-3 interrupt, and, in response, the controller switches a mode of the second communicator from a standby mode to an operating mode or from the operating mode to the standby mode, and
wherein the type-3 interrupt is an interrupt generated by a second timer different from the timer at a certain time period.

16. The surveillance apparatus of claim 10, wherein in response to the controller detecting a type-4 interrupt, the controller sends another event occurrence alarm to the outside using the second communicator and sends another image, corresponding to the other event, acquired by the image sensor to the outside using the first communicator, and
wherein the type-4 interrupt is an interrupt generated in response to determining that the other event has occurred.

17. The surveillance method of claim 1, wherein, in the type-1 interrupt processing, upon completion of generation of the detection data by the at least one detector, power to the at least one detector is shut off.

18. The surveillance method of claim 17, wherein, in the type-1 interrupt processing, in response to determining that the event has occurred based on the detection data, the power-off states of the first communicator and the image sensor are switched to the power-on state after the power to the at least one detector is shut off.

19. A surveillance apparatus comprising:
a first communicator configured to transmit or receive data to or from an outside of the surveillance apparatus at a first frequency;
a second communicator configured to transmit or receive data to or from the outside of the surveillance apparatus at a second frequency lower than the first frequency;
a controller configured to control transmission or reception of the data through the first communicator and the second communicator, and detect an interrupt; and
an image sensor configured to acquire an image,
wherein in response to the controller detecting a type-2 interrupt, the controller is configured to:
control operation of at least one of the first communicator, the second communicator, the image sensor, and at least one detector configured to generate detection data, according to control information included in the type-2 interrupt; and
determine at least one element, included in or connected to the surveillance apparatus, corresponding to the control information, and switch an operation mode of the determined at least one element or starts to supply power to the determined at least one element in response to the type-2 interrupt while maintaining an operation mode and a power state of elements other than the at least one element, and
wherein the at least one element comprises at least one of the first communicator, the image sensor, and the at least one detector.

* * * * *